A. P. LORD, C. A. LINDBERG & J. V. FLANIGAN.
OVERHEAD TROLLEY.
APPLICATION FILED MAR. 27, 1911.
1,026,874.
Patented May 21, 1912.
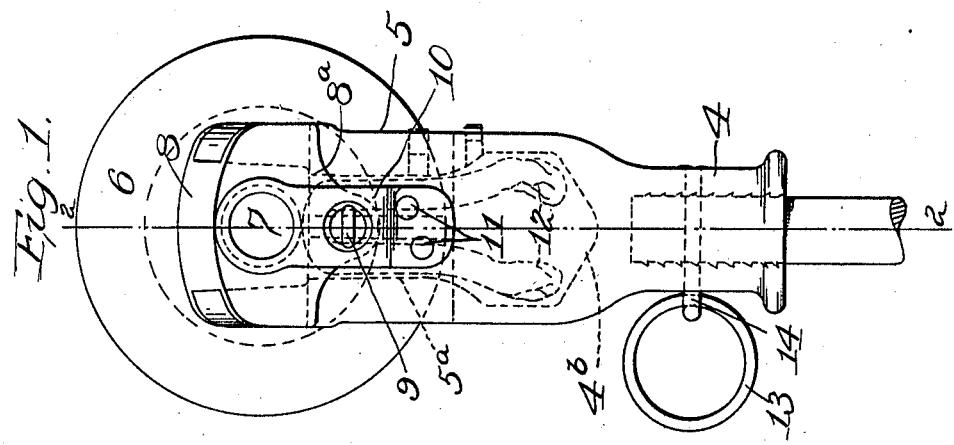
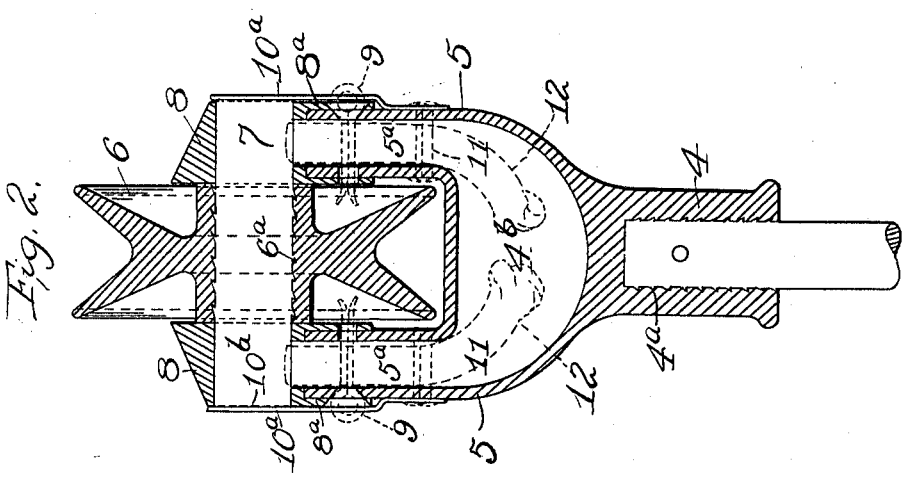

UNITED STATES PATENT OFFICE.

ALLEN P. LORD, CHARLES A. LINDBERG, AND JOHN V. FLANIGAN, OF BRADFORD, PENNSYLVANIA; SAID LORD AND LINDBERG ASSIGNORS TO SAID FLANIGAN.

OVERHEAD TROLLEY.

1,026,874.  Specification of Letters Patent.  Patented May 21, 1912.

Application filed March 27, 1911. Serial No. 617,120.

*To all whom it may concern:*

Be it known that we, ALLEN P. LORD, CHARLES A. LINDBERG, and JOHN V. FLANIGAN, citizens of the United States, residing at Bradford, Pennsylvania, have invented certain new and useful Improvements in Overhead Trolleys, of which the following is a specification.

Our present invention relates to improvements in overhead trolleys for electric railways, and has among others for its object the following: first, to provide a construction which shall be extremely simple and economical of construction, and of extreme durability and efficiency in service; second, to provide means by which the wheel may be easily and quickly removed when worn and replaced, whereby such change can be readily made by the motorman in cold weather; third, to provide a self-lubricating construction in which a proper supply of lubricant will always be maintained for the moving or bearing parts, and, fourth, to provide a construction which will be free from any liability of catching on or injuring the trolley wire in case of the wheel jumping the trolley.

With these and possibly other objects in view the invention includes the novel features of construction and combination and arrangement of parts hereinafter described and particularly set forth in the appended claims.

We have illustrated our invention by the aid of the accompanying drawings, in which—

Figure 1 is a side elevation partly in section; and Fig. 2 is a section on line 2—2 of Fig. 1.

Referring by reference characters to these drawings, the numeral 4 designates the shank or socket of the harp, which socket is designed to be secured in a suitable manner upon the end of the pole, a convenient way of forming these being to cast the parts one into the other and to make the joint the more effective one of them may be provided with a roughened or serrated surface, as indicated at 4ª, so that the parts are the more thoroughly interlocked or engaged when cast together. The arms 5 of the socket which are substantially parallel with each other are hollow, as also is the body of the socket, the hollow portion 4ᵇ of the socket forming an oil chamber from which lead the passages 5ª upward in the hollow arms, through which the lubricant is conveyed to the bearings of the trolley wheel in the manner hereinafter described. The trolley wheel is indicated at 6, and may be of the ordinary or any desired construction and material, and is preferably cast solidly upon a steel shaft 7, and in casting it upon the shaft one of the parts may likewise be corrugated, as indicated at 6ª, so as to insure the more rigid connection between the two. The shaft 7 is journaled in bearings 8, preferably of brass, which are seated in tapered recesses in the forks and have depending wings or flanges 8ª which engage opposite sides of the arms of the fork, and are held in place by cotter pins 9. The tapered fit of the bearings, coupled with the overlapping flanges, holds these rigidly in position, so that the only work which the cotter pins have to do is to prevent upward movement, while at the same time if, by reason of wear of the wheel or for any other purpose, it is desirable to remove the wheel, this is easily accomplished by the motorman even in cold weather and without removing his gloves by simply withdrawing the cotter pins and lifting out the bearings with the wheel, whereupon the wheel and its shaft may be removed from the bearings and a new wheel substituted or new bearings, as may be found desirable. In order to reduce, as far as possible, any resistance to the flow of electricity through the bearings, we provide metallic conductor springs 10 which are riveted to the forks, as indicated at 11, and have their upper portions bearing against the opposite ends of the shaft, as indicated at 10ª. In order to provide for efficient lubrication, we insert in each arm a conducting wick or capillary medium, as indicated at 12, which, when in position, occupies an inverted U-shape, the two ends depending into the oil chamber and the intermediate portion extending across and into contact with the under side of the steel shaft, and being retained from being jarred out of contact therewith by the cotter pin 9.

It will be noticed that the upper faces of the bearing blocks are inclined outwardly and downwardly so that in case of a trolley wheel jumping the wire, the latter slides quickly and freely from off this inclined surface without injury. The ordinary rope ring is shown at 13, and may be connected by a bolt 14 passing through the socket and pole.

Having thus described our invention what we claim is:

1. In combination a harp having recesses in the upper ends of the arms thereof, bearing blocks seated in said recesses and having depending flanges embracing opposite sides of the respective arms, cotter pins connecting said depending flanges with said arms, and a trolley wheel having its shaft journaled in said bearing blocks.

2. In combination a harp having bearing blocks removably carried by the arms thereof, and a trolley wheel having its shaft journaled in said blocks, said harp having an oil containing chamber and communicating passages extending up through said arms and communicating with corresponding ports or passages through the bearing blocks, and inverted U-shaped wicks having their lower ends resting in the oil chamber and means for holding their intermediate portions in contact with the under side of the trolley wheel shaft.

In testimony whereof, we affix our signatures in presence of two witnesses.

ALLEN P. LORD.
CHARLES A. LINDBERG.
JOHN V. FLANIGAN.

Witnesses:
KATHARINE BURKE,
EDWIN E. TAIT.

---

Copies of this patent may be obtained for five cents each, by addressing the "Commissioner of Patents, Washington, D. C."